United States Patent
Kikuchi et al.

(10) Patent No.: US 12,105,404 B2
(45) Date of Patent: Oct. 1, 2024

(54) LENS APPARATUS, IMAGE PICKUP APPARATUS, CONTROL METHOD OF LENS APPARATUS, AND STORAGE MEDIUM

(71) Applicant: CANON KABUSHIKI KAISHA, Tokyo (JP)

(72) Inventors: Hirotaro Kikuchi, Tokyo (JP); Nobutaka Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 17/560,559

(22) Filed: Dec. 23, 2021

(65) Prior Publication Data
US 2022/0206368 A1    Jun. 30, 2022

(30) Foreign Application Priority Data
Dec. 28, 2020 (JP) .................. 2020-218350

(51) Int. Cl.
| | |
|---|---|
| G03B 17/14 | (2021.01) |
| G02B 7/04 | (2021.01) |
| G03B 7/20 | (2021.01) |
| G03B 17/17 | (2021.01) |
| G03B 17/18 | (2021.01) |
| H04N 23/663 | (2023.01) |

(52) U.S. Cl.
CPC ............ *G03B 17/14* (2013.01); *G02B 7/04* (2013.01); *G03B 7/20* (2013.01); *G03B 17/17* (2013.01); *G03B 17/18* (2013.01); *H04N 23/663* (2023.01); *G03B 2206/00* (2013.01)

(58) Field of Classification Search
CPC .......... G03B 17/14; G03B 7/20; G03B 17/17; G03B 17/18; G03B 2206/00; H04N 5/23209; H04N 5/23212
See application file for complete search history.

(56) References Cited

U.S. PATENT DOCUMENTS

| | | | | |
|---|---|---|---|---|
| 2011/0234861 A1* | 9/2011 | Endo | ..................... | H04N 25/611 |
| | | | | 348/E9.037 |
| 2012/0147227 A1* | 6/2012 | Yoshimura | ........... | H04N 23/672 |
| | | | | 348/E5.079 |
| 2022/0187686 A1* | 6/2022 | Kita | ....................... | H04N 23/00 |

FOREIGN PATENT DOCUMENTS

| | | | | |
|---|---|---|---|---|
| CN | 113424102 A | * | 9/2021 | ............... G02B 7/34 |
| JP | 63-286808 A | | 11/1988 | |
| JP | 2008-268403 A | | 11/2008 | |

\* cited by examiner

*Primary Examiner* — Christopher E Mahoney
(74) *Attorney, Agent, or Firm* — Cowan, Liebowitz & Latman, P.C.

(57) ABSTRACT

A lens apparatus attachable to and detachable from a camera body includes a reflective optical system, a memory configured to store aperture information based on an optical condition of the lens apparatus, and a transmitter configured to transmit the aperture information acquired from the memory to the camera body.

8 Claims, 13 Drawing Sheets

PLANE VIEW a-a SECTIONAL VIEW

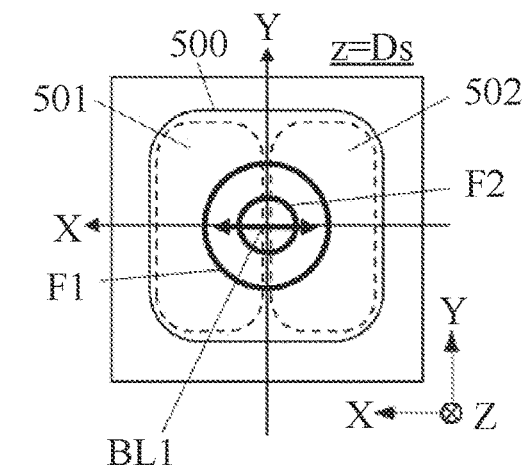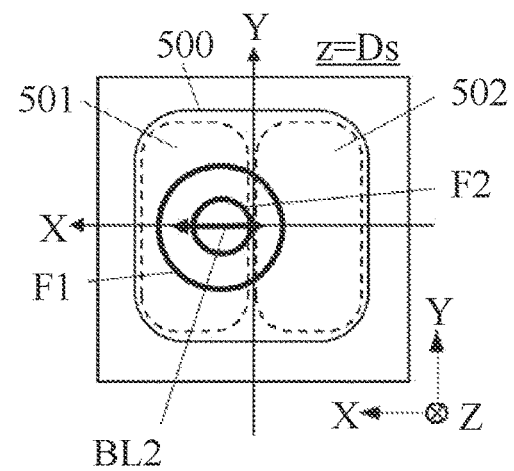
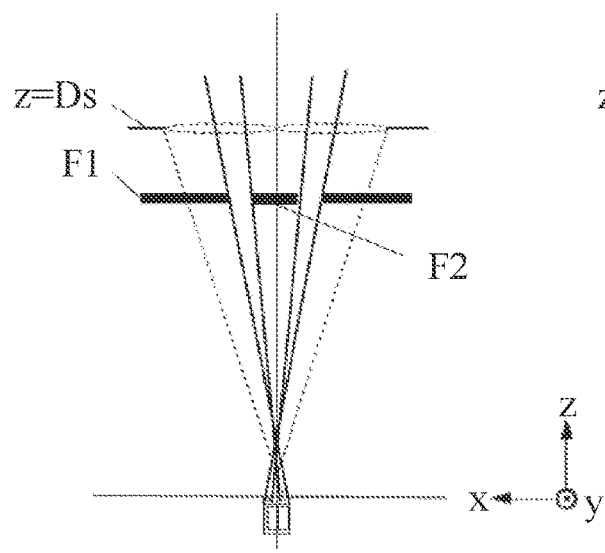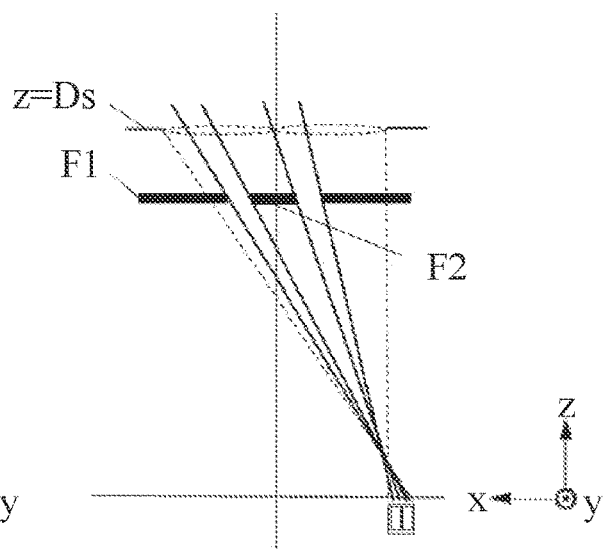
FIG. 8A  FIG. 8B

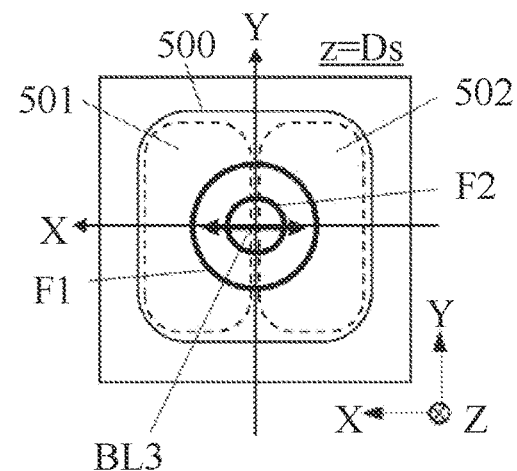
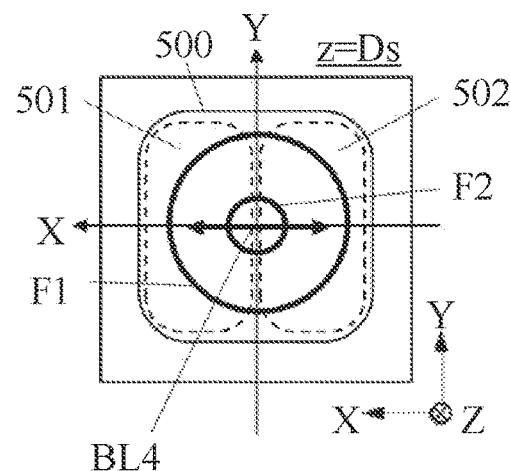
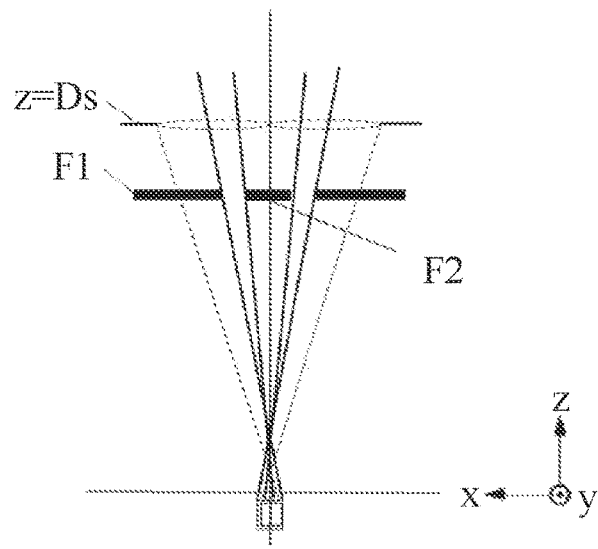
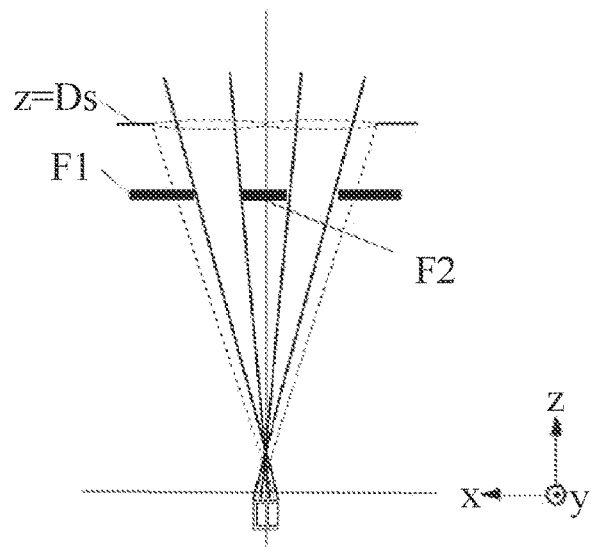
FIG. 9A  FIG. 9B

LENS APPARATUS, IMAGE PICKUP APPARATUS, CONTROL METHOD OF LENS APPARATUS, AND STORAGE MEDIUM

BACKGROUND OF THE INVENTION

Field of the Invention

The present invention relates to a lens apparatus and an image pickup apparatus.

Description of the Related Art

Phase difference focus detecting methods (phase difference AFs) are known as autofocusing (AF) methods for image pickup apparatuses. The phase difference AFs are AFs often used for digital still cameras, and some of them use an image sensor for a focus detecting sensor. For example, a pupil division type phase difference AF performs a focus detection by acquiring a relative image shift amount between a pair of images formed by light beams (AF light beams) that have passed through a pair of areas in the exit pupil of the imaging optical system, and by calculating a defocus amount based on the image shift amount and a conversion coefficient.

Japanese Patent Laid-Open No. ("JP") 2008-268403 discloses a focus detecting apparatus that calculates an accurate defocus amount by calculating a conversion coefficient using light shielding information on a diaphragm frame or a lens frame. JP 63-286808 discloses a focus detecting system for determining whether or not an accurate focus detection is available based on information on an outer diameter of an exit pupil, an inner diameter of the exit pupil, and a position of the exit pupil obtained from a reflective telephoto lens.

However, the configurations disclosed in JPs 2008-268403 and 63-286808 do not correct the image signal or calculate the conversion coefficient when a shielding way of the AF light beam changes, where a central portion of the light beam is shielded in a reflective telephoto lens (reflective optical system), causing a focus detecting error.

SUMMARY OF THE INVENTION

The present invention provides a lens apparatus, an image pickup apparatus, a control method of the lens apparatus, and a storage medium, each of which can detect an accurate defocus amount with a reflective optical system.

A lens apparatus according to one aspect of the present invention attachable to and detachable from a camera body includes a reflective optical system, a memory configured to store aperture information based on an optical condition of the lens apparatus, and a transmitter configured to transmit the aperture information acquired from the memory to the camera body.

An image pickup apparatus according to another aspect of the present invention attachable to and detachable from a lens apparatus that includes a reflective optical system includes an image sensor, a receiver configured to receive aperture information based on an optical condition of the lens apparatus from the lens apparatus, and a calculation unit configured to calculate a defocus amount based on the aperture information.

A control method according to another aspect of the present invention of a lens apparatus that includes a reflective optical system and is attachable to and detachable from a camera body includes the steps of acquiring from a memory aperture information based on an optical condition of the lens apparatus, and transmitting the aperture information acquired from the memory to the camera body. A storage medium storing a computer program that causes a computer to execute the above control method also constitutes another aspect of the present invention.

Further features of the present invention will become apparent from the following description of exemplary embodiments with reference to the attached drawings.

BRIEF DESCRIPTION OF THE DRAWINGS

FIGS. 8A and 8B are schematic views of light shielding for each image height by a lens apparatus according to each embodiment.

FIGS. 9A and 9B are schematic views of light shielding for each exit pupil diameter by the lens apparatus according to each embodiment.

DESCRIPTION OF THE EMBODIMENTS

Figure 1A:
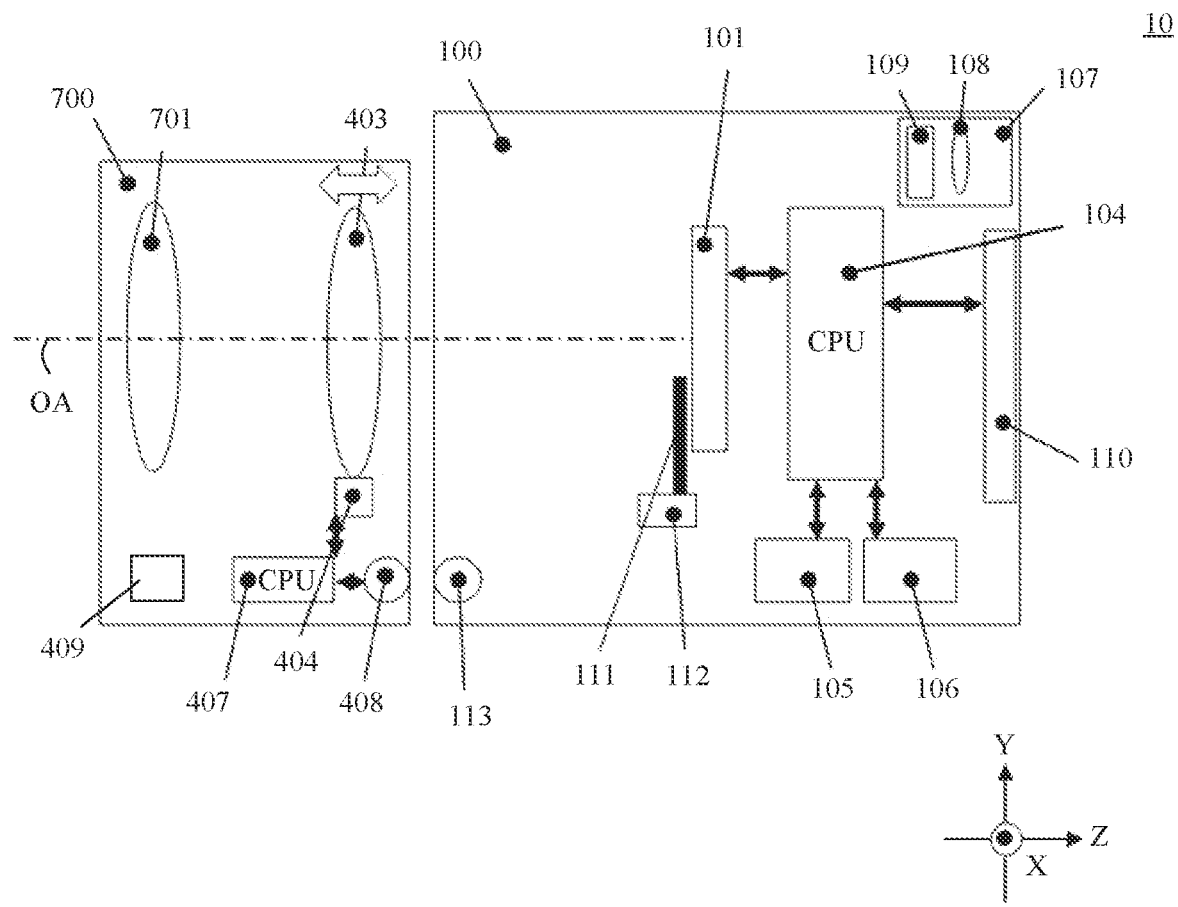
FIGS. 1A and 1B are schematic configuration diagrams of an imaging system according to each embodiment.

Referring now to the accompanying drawings, a detailed description will be given of embodiments according to the present invention. Corresponding elements in respective figures will be designated by the same reference numerals, and a duplicate description thereof will be omitted.

In each embodiment, the present invention is applied to an image pickup apparatus such as a digital camera, but the present invention is widely applicable to an apparatus different from an image pickup apparatus such as a focus detecting apparatus, a distance detecting apparatus, an information processing apparatus, and an electronic apparatus. Each embodiment has a concrete and specific configuration in order to facilitate understanding and explanation of the present invention, but the present invention is not limited to such a specific configuration. For example, in the following embodiment, the present invention is applied to a single-lens reflex type digital camera in which a lens is interchangeable, but the present invention is also applicable to a digital camera and a video camera in which a lens is uninterchangeable (or integrated). The present invention is also applicable to an arbitrary electronic apparatus including a camera, such as a smart phone, a personal computer (laptop, tablet, desktop type, etc.), a gaming machine, or the like.

First Embodiment

Overall Configuration

Figure 1B:
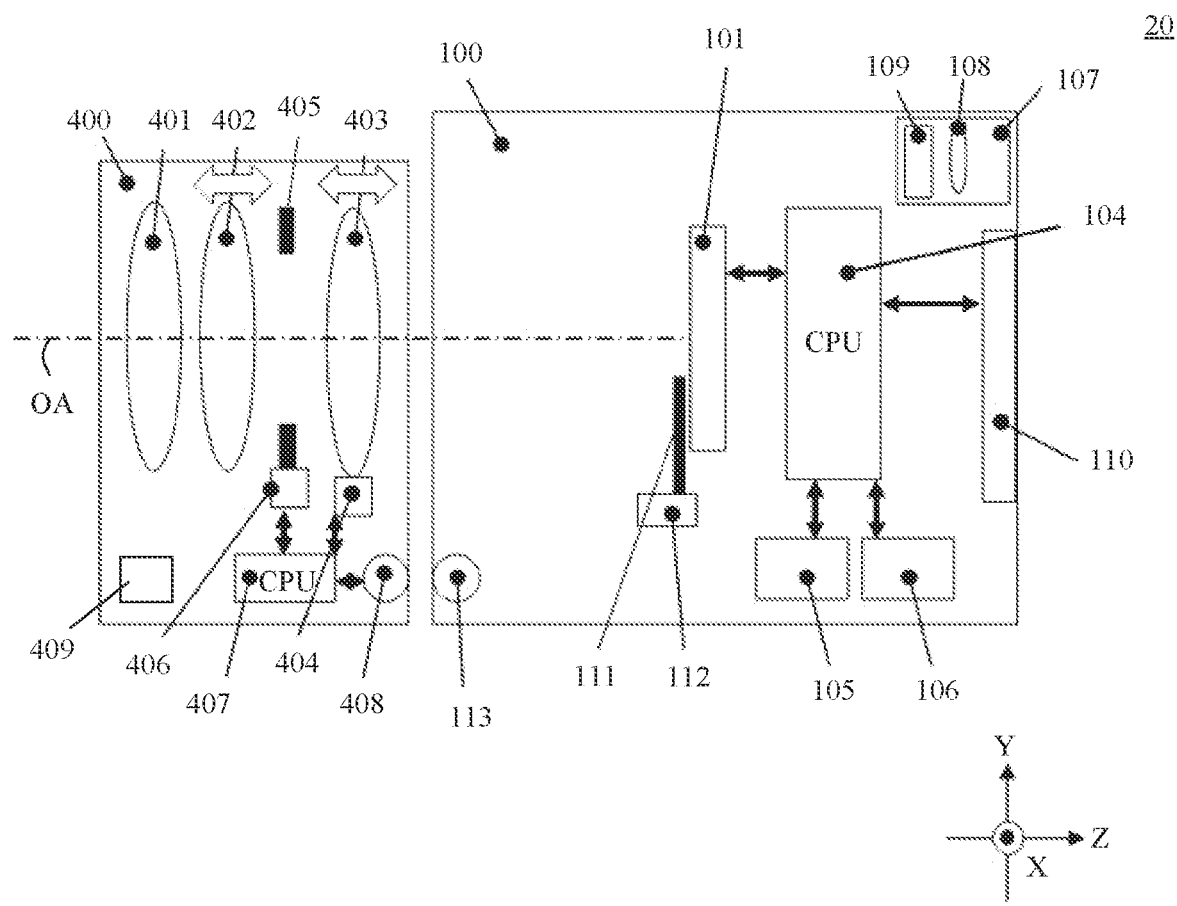

Referring now to FIGS. 1A and 1B, a description will be given of an imaging system (camera system) 10 according to a first embodiment of the present invention. FIG. 1A is a schematic configuration diagram of the imaging system 10 according to this embodiment. The imaging system 10 includes a camera body (lens interchangeable type digital camera body, image pickup apparatus) 100, and a lens apparatus (interchangeable lens) 700 attachable to and detachable from the camera body 100. FIG. 1B is a schematic configuration diagram of an imaging system 20 according to a comparative example. The imaging system 20 includes the camera body 100, and a lens apparatus (interchangeable lens) 400 attachable to and detachable from the camera body 100. The lens apparatus 700 according to this embodiment includes a reflective optical system (reflective telephoto lens). On the other hand, the lens apparatus 400 according to the comparative example has no reflective optical system.

The lens apparatus 400 and the lens apparatus 700 have different types of lenses, and are detachable from the camera body 100. A light beam transmitted through each lens unit (imaging optical system) in the lens apparatus 700 (or lens apparatus 400) is guided to an image sensor 101 that receives an object image. The image sensor 101 includes pixel units arranged in a matrix that convert the object image into an electric signal. The pixel information converted into the electric signal is output to a camera CPU 104. The camera CPU 104 performs various correction processing for obtaining an image signal and a focus detecting signal, and processing for converting the obtained image signal into a live-view image, a recorded image, and an EVF image. In this embodiment, the camera CPU 104 performs the above processing, but the present invention is not limited to this embodiment, and a dedicated circuit may be used.

An operation member 105 includes various components for setting an imaging mode and an imaging condition (such as an F-number, an ISO speed, and an exposure time) of the camera body 100. A storage medium 106 is a flash memory, which is a medium for recording captured still images and motion images. An in-viewfinder display unit 107 includes a display 108 and an eyepiece 109 as small and high-definition display unit such as an organic EL display and a liquid crystal display. An external display unit 110 uses an organic EL display or a liquid crystal display having a screen size suitable for naked eyes viewing. Various information such as a setting state of the camera body 100, a live-view image, and a captured image are displayed on the in-viewfinder display unit 107 and the external display unit 110.

A focal plane shutter 111 is disposed in front of the image sensor 101. A shutter driver 112 includes, for example, a motor, and controls the exposure time in capturing a still image by controlling driving of the blades of the shutter. A camera-side communication terminal 113 is provided on a camera mount unit used to mount the lens apparatus 700 (or the lens apparatus 400). The camera-side communication terminal 113, together with a lens-side communication terminal 408 provided on a lens mount unit, transmits and receives information exchanged between the camera CPU 104 and the lens CPU 407 described later. The lens apparatus 700 (or lens apparatus 400) includes an unillustrated memory (lens memory).

The lens apparatus 700 (or lens apparatus 400) is attachable to and detachable from the camera body 100. The lens apparatus 700 includes the reflective optical system. The lens apparatus 400 is a zoom lens having a variable focal length. However, the type of lens is not limited.

The light beam from the object passes through a first lens unit 401 (or a first lens unit 701), a second lens unit 402 (only illustrated in FIG. 1B), and a third lens unit 403, and forms an object image on an imaging plane of the image sensor 101 in the camera body 100. The first lens unit 701 includes the reflective optical system. A detailed structure thereof will be described later. The second lens unit 402 includes a variator that moves back and forth in a direction along the optical axis OA (optical axis direction) to vary the magnification. The third lens unit 403 includes a focus lens that moves back and forth in the optical axis direction during focusing. The third lens unit 403 is driven by a focus driver 404 that can use a stepping motor or the like.

As illustrated in FIG. 1B, a diaphragm 405 provided to the lens apparatus 400 includes a plurality of diaphragm blades for adjusting a light amount incident on the camera body 100. A diaphragm driver 406 adjusts an aperture diameter made by the diaphragm blades to a predetermined imaging F-number. Since it is difficult to install the diaphragm 405 and the diaphragm driver 406 in the reflective optical system illustrated in FIG. 1A, the diaphragm 405 or the diaphragm driver 406 is not provided and an open F-number is basically used. The lens CPU 407 communicates with the camera CPU 104 via the lens-side communication terminal 408 and the camera-side communication terminal 113 to transmit and receive various information, and controls driving of the focus driver 404 and the diaphragm driver 406 based on a command from the camera CPU 104.

The zoom range and open F-number of the lens apparatus 400 are designed according to the imaging intent, but the lens apparatus 700 that includes the reflective optical system basically has no control mechanism of a zoom lens or a diaphragm.

Each of the lens apparatuses 400 and 700 includes a memory (memory) 409. The memory 409 in the lens apparatus 400 stores information (flag) indicating that the lens apparatus includes no reflective optical system. The memory 409 in the lens apparatus 700 stores information (flag) indicating that the lens apparatus includes the reflective optical system. The lens apparatus 700 includes a memory (storage unit) 409 that stores a relationship as a data table between the optical condition and the aperture information. The lens CPU 407 reads the aperture information (aperture information corresponding to the optical condition) based on the optical condition from the memory 409.

Figure 2:
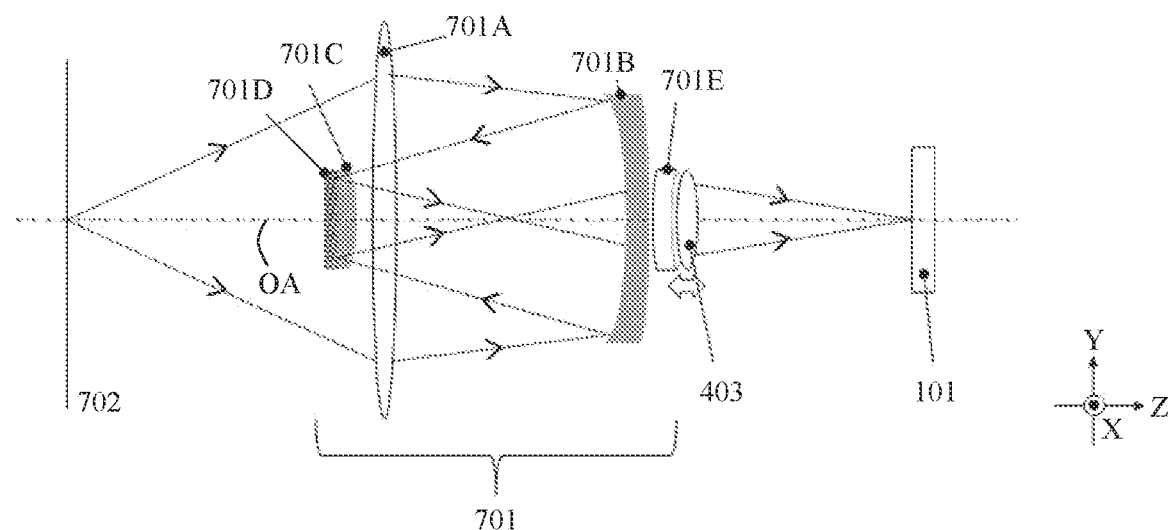
FIG. 2 is a schematic view of a reflective optical system according to each embodiment.

Referring now to FIG. 2, a description will be given of the first lens unit 701 illustrated in FIG. 1A, that is, the lens including the reflective optical system. FIG. 2 is a schematic view of the reflective optical system. In FIG. 2, a left solid line 702 denotes an object, and dotted lines denote light rays emitted from one point on the object 702. The light emitted from the object 702 is focused through a lens 701A and reflected by a lens 701B. The light reflected and refracted by a lens 701C passes through the lens 701B, a lens 701E, and the third lens unit (focus lens) 403, and then forms an image on the imaging plane of the image sensor 101. The lens 701B is a reflective lens (reflective optical system) that reverses and reflects the optical path in FIG. 2. A light shielding unit 701D is attached to the lens 701C on a surface opposite to the optical path (on the object surface side). By thus folding back the optical path inside the first lens unit 701, an image having a long focal length on the imaging plane can be obtained despite its small size.

Image Sensor

Figure 3:
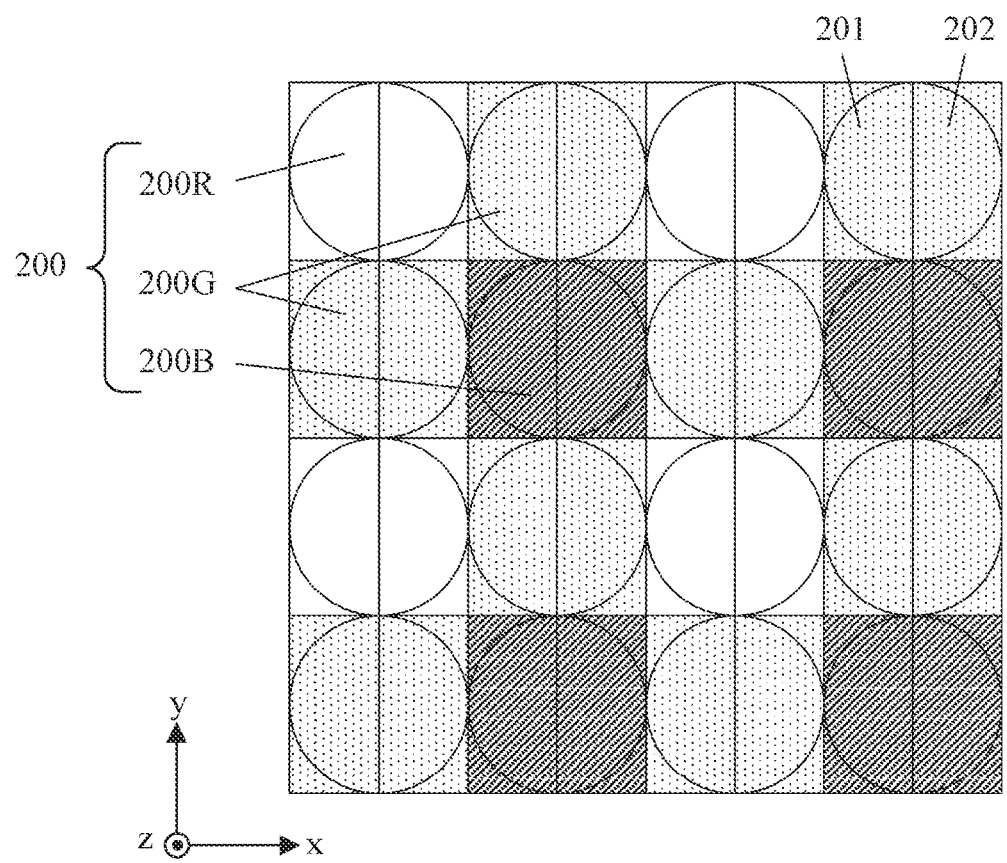
FIG. 3 is a schematic diagram of a pixel array according to each embodiment.
Figure 4A:
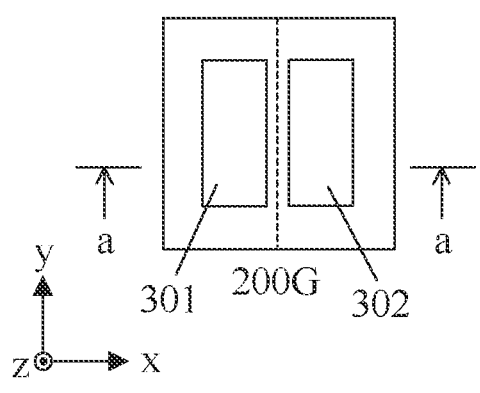
FIGS. 4A and 4B are schematic diagrams of a pixel structure according to each embodiment.
Figure 4B:
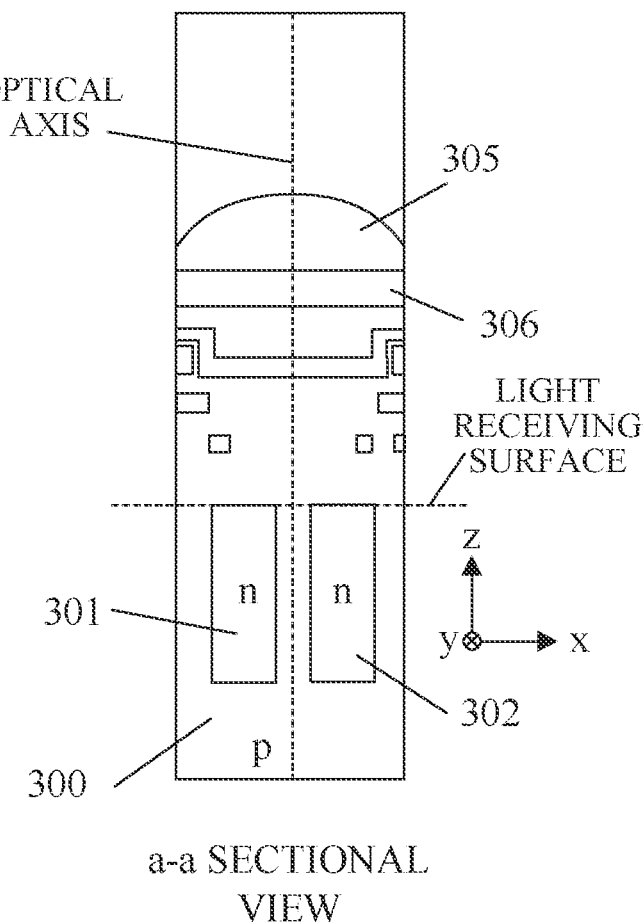

Referring now to FIGS. 3, 4A, and 4B, a description will be given of a pixel arrangement and a pixel structure of the image sensor 101 according to this embodiment. FIG. 3 is a schematic diagram of the pixel arrangement of the image sensor 101. FIGS. 4A and 4B are schematic views of the pixel structure of the image sensor 101, FIG. 4A is a plan view of a pixel 200G of the image sensor 101 (viewed from the +z direction), and FIG. 4B is a sectional view (viewed from the −y direction) taken along a line a-a in FIG. 4A, respectively.

FIG. 3 illustrates the pixel arrangement (arrangement of imaging pixels) of the image sensor (two-dimensional CMOS sensor) 101 in a range of 4 columns×4 rows. In this embodiment, each of the imaging pixel (pixels 200R, 200G, and 200B) includes two subpixels (focus detecting pixels) 201 and 202. In FIG. 2, the arrangement of the subpixels is illustrated in a range of 8 columns×4 rows.

As illustrated in FIG. 3, in a pixel group 200 of 2 columns×2 rows, pixels 200R, 200G, and 200B are arranged in a Bayer array. That is, among the pixel group 200, the pixel 200R having the spectral sensitivity of R (red) is located at the upper left corner, the pixel 200G having the spectral sensitivity of G (green) is located at the upper right corner and the lower left corner, and the pixel 200B having the spectral sensitivity of B (blue) is located at the lower right corner. Each of the pixels 200R, 200G, and 200B (each imaging pixel) includes the subpixel (first focus detecting pixel) 201 and the subpixel (second focus detecting pixel) 202 arranged in two columns×one row. The subpixel 201 is a pixel that receives a light beam that has passed through the first pupil part area in the imaging optical system. The subpixel 202 is a pixel that receives a light beam that has passed through the second pupil part area in the imaging optical system. The plurality of subpixels 201 form a first pixel group, and the plurality of subpixels 202 form a second pixel group. The image sensor 101 has many sets of 4 (columns)×4 (rows) imaging pixels (8 (columns)×4 (rows) subpixels) in on its surface, and outputs an imaging signal (subpixel signal or focus detecting signal).

As illustrated in FIG. 4B, the pixel 200G according to this embodiment includes a microlens 305 for condensing incident light on a light receiving surface side of the pixel. A plurality of microlenses 305 are two-dimensionally arranged, and each microlens 305 is disposed at a position apart from a light receiving surface by a predetermined distance in the z-axis direction (direction of the optical axis OA). The pixel 200G further includes a photoelectric conversion unit 301 and a photoelectric conversion unit 302 that are $N_H$-divided (divided into two) in the x direction and $N_V$-divided (divided into one) in the y direction. The photoelectric conversion units 301 and 302 correspond to the subpixels 201 and 202, respectively. Thus, the image sensor 101 includes a plurality of photoelectric conversion units for a single microlens, and the microlenses are arranged two-dimensionally. Each of the photoelectric conversion units 301 and 302 is configured as a pin-structured photodiode in which an intrinsic layer is sandwiched between a p-type layer and an n-type layer. If necessary, the intrinsic layer may be omitted and it may be configured as a pn-junction photodiode.

In the pixel 200G (each pixel), a G (green) color filter 306 is provided between the microlens 305 and the photoelectric conversion units 301 and 302. Similarly, in the pixels 200R and 200B (each pixel), a corresponding one of R (red) and B (blue) color filter 306 is provided between the microlens 305 and the photoelectric conversion units 301 and 302. If necessary, the spectral transmittance of the color filter 306 can be changed for each subpixel, or the color filter may be omitted.

As illustrated in FIG. 3, the light incident on the pixels 200G (200R or 200B) is condensed by the microlens 305, dispersed (or separated) by the G color filter 306 (R or B color filter 306), and then received by the photoelectric conversion units 301 and 302. In the photoelectric conversion units 301 and 302, pairs of electrons and holes are generated according to the received light amount, and after they are separated by the depletion layer, negatively charged electrons are accumulated in the n-type layer. On the other hand, the holes are discharged to the outside of the image sensor 101 through the p-type layer connected to a constant voltage source (not shown). The electrons accumulated in the n-type layer of the photoelectric conversion units 301 and 302 are transferred to a capacitor (FD) via a transfer gate based on a scan control by an image sensor driving circuit 124, and converted into a voltage signal.

Figure 5:
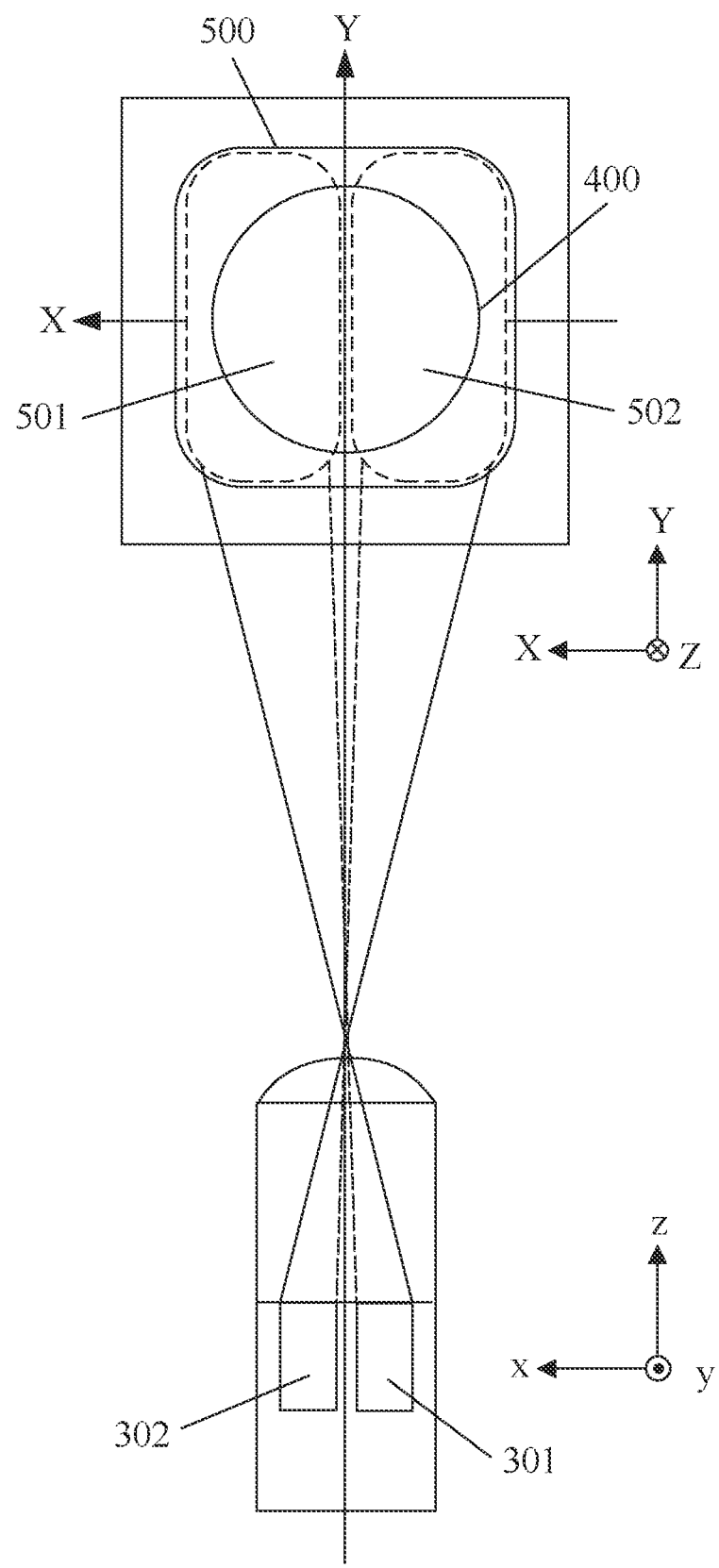
FIG. 5 is an explanatory diagram of an image sensor and a pupil dividing function according to each embodiment.

Referring now to FIG. 5, a description will be given of a pupil dividing function of the image sensor 101. FIG. 5 is an explanatory diagram of the pupil dividing function of the image sensor 101, illustrating a pupil dividing state in a single pixel. FIG. 5 illustrates a sectional view taken along a light a-a of the pixel structure illustrated in FIG. 4A viewed from the +y side, and the exit pupil surface of the imaging optical system. In FIG. 5, the x-axis and y-axis of the sectional view are inverted with respect to the x-axis and y-axis of FIGS. 4A and 4B for correspondence to the coordinate axes of the exit pupil surface.

In FIG. 5, a pupil part area (first pupil part area) 501 of the subpixel (first focus detecting pixel) 201 has a substantially conjugate relationship with the light receiving surface of the photoelectric conversion unit 301 whose center of gravity is eccentric in the −x direction, via the microlens 305. Therefore, the pupil part area 501 represents a pupil area that can be received by the subpixel 201. The center of gravity of the pupil part area 501 of the subpixel 201 is eccentric to the +X side on the pupil surface. A pupil part area (second pupil part area) 502 of the subpixel (second focus detecting pixel) 202 has a substantially conjugate relationship with the light receiving surface of the photoelectric conversion unit 302 whose center of gravity is eccentric in the +x direction, via the microlens 305. Therefore, the pupil part area 502 represents a pupil area that can be received by the subpixel 202. The center of gravity of the pupil part area 502 of the subpixel 202 is eccentric to the −X side on the pupil surface. The pupil area 500 is a pupil area in which light can be received by the entire pixel 200G in combination of the photoelectric conversion units 301 and 302 (subpixels 201 and 202).

The imaging plane phase-difference AF is affected by the diffraction because the pupil is divided using the microlens 305 of the image sensor 101. In FIG. 5, the pupil distance to the exit pupil surface is several tens of mm, whereas the microlens 305 has a diameter of several μm. The F-number of the microlenses 305 becomes tens of thousands, and diffraction blurs of several tens of mm level occur. Images on the light receiving surfaces of the photoelectric conversion units 301 and 302 do not become a clear pupil area or pupil part area, but become a pupil intensity distribution (incident angle distribution of the light receiving rate).

Figure 6:
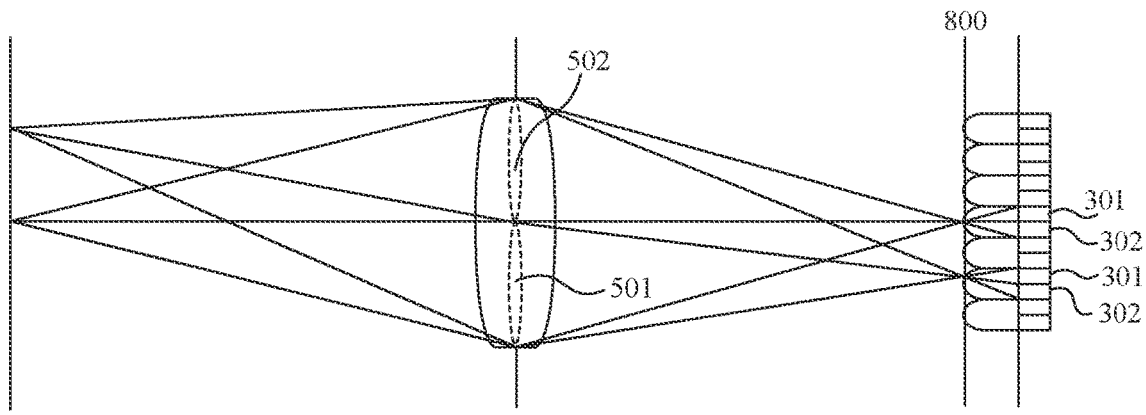
FIG. 6 is an explanatory diagram of an image sensor and a pupil dividing function according to each embodiment.

Referring now to FIG. 6, a description will be given of the correspondence relationship between the image sensor 101 and the pupil division. FIG. 6 is an explanatory diagram of the image sensor 101 and the pupil dividing function. Light beams that have passed through the different pupil part areas 501 and 502 of the pupil area in the imaging optical system enter respective pixels on an imaging plane 800 of the image sensor 101 at different angles, and are received by the subpixels 201 and 202 that are divided into 2×1. In this embodiment, the pupil area is divided into two in the horizontal direction, but the present invention is not limited to this embodiment, and the pupil area may be divided in the vertical direction, if necessary.

In this embodiment, the image sensor 101 includes a first focus detecting pixel that receives a light beam that has passed through a first pupil part area in an imaging optical system (imaging lens). The image sensor 101 further includes a second focus detecting pixel that receives a light beam that has passed through a second pupil part area different from the first pupil part area in the imaging optical system. The image sensor 101 further includes a plurality of imaging pixels that receive a light beam that has passed through a pupil area that is a combination of the first pupil part area and the second pupil part area in the imaging optical system. In this embodiment, each imaging pixel (pixel 200) includes the first focus detecting pixel (subpixel 201) and the second focus detecting pixel (subpixel 202). If necessary, the imaging pixel, the first focus detecting pixel, and the second focus detecting pixel may include separate pixels. At this time, the first focus detecting pixel and the second focus detecting pixel are partially (discretely) arranged in part of the imaging pixel array.

In this embodiment, the camera body 100 collects received light signals of the first focus detecting pixels (subpixels 201) in each pixel of the image sensor 101 to generate a first focus detecting signal, and received light signals of the second focus detecting pixels (subpixels 202) in each pixel to generate a second focus detecting signal. The camera body 100 generates an imaging signal (captured image) by adding (summing) up the signals of the first and second focus detecting pixels for each pixel in the image sensor 101.

Relationship Between Defocus Amount and Image Shift Amount

Figure 7:
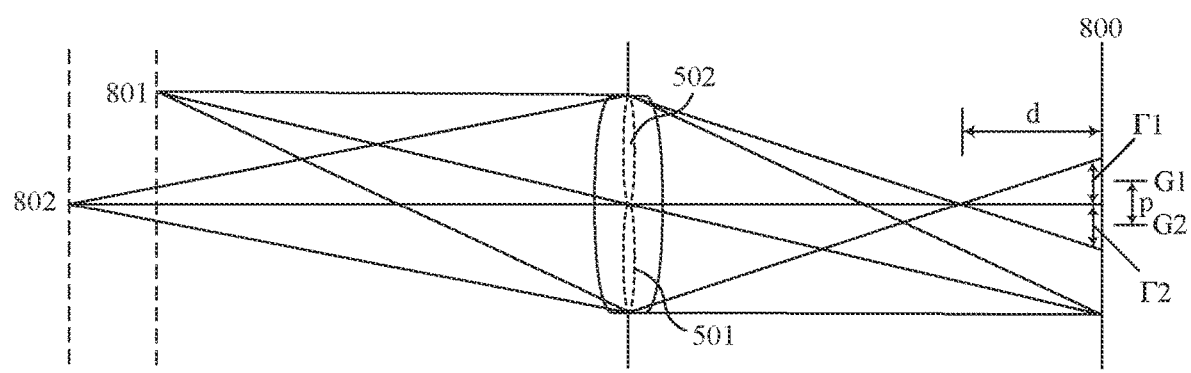
FIG. 7 is a diagram illustrating a relationship between a defocus amount and an image shift amount according to each embodiment.

Referring now to FIG. 7, a description will be given of a relationship between a defocus amount and an image shift amount regarding the first focus detecting signal acquired from the subpixel 201 and the second focus detecting signal acquired from the subpixel 202 in the image sensor 101. FIG. 7 illustrates the relationship between the defocus amount and the image shift amount. In FIG. 7, the image sensor 101 is disposed on the imaging plane 800, and similar to FIGS. 5 and 6, the exit pupil in the imaging optical system is divided into two pupil part areas 501 and 502.

A defocus amount d is defined as follows: is a distance from an imaging position of the object to the imaging plane 800, a front focus state in which the imaging position is closer to the object than the imaging plane 800 has a minus sign (d<0), and a back focus state in which the imaging position is located farther from the object than the imaging plane 800 has a plus sign (d>0). The defocus amount d=0 is established in the in-focus state in which the imaging position of the object is located on the imaging plane 800 (in-focus position). FIG. 7 illustrates an object 801 in the in-focus state (d=0) and an object 802 in the front focus state (d<0), respectively. The front focus state (d<0) and the back focus state (d>0) are collectively referred to as a defocus state (|d|>0).

In the front focus state (d<0), among light beams from the object 802, the light beam that has passed through the pupil part area 501 (or the pupil part area 502) is once focused. Then, the light beam spreads over a width Γ1 (Γ2) around the center of gravity position G1 (G2) of the light beam, and the image becomes blurred on the imaging plane 800. The blurred image is received by the subpixel 201 (subpixel 202) constituting each pixel in the image sensor 101, and the first focus detecting signal (second focus detecting signal) is generated. Therefore, the first focus detecting signal (second focus detecting signal) is recorded at the center of gravity position G1 (G2) on the imaging plane 800 as an object image in which the object 802 is blurred to the width Γ1 (Γ2). The blur width Γ1 (Γ2) of the object image increases substantially in proportion to an increase of the absolute value |d| of the defocus amount d. Similarly, an absolute value of the image shift amount p (=difference G1−G2 between the center of gravity positions of the light beams) of the object image between the first focus detecting signal and the second focus detecting signal increases substantially in proportion to an increase of the absolute value of the defocus amount d. This is similarly applied to the back focus state (d>0), but the image shift direction of the object image between the first focus detecting signal and the second focus detecting signal is opposite to that of the front focus state.

This embodiment can calculate the defocus amount d based on a conversion coefficient K used to convert a predetermined image shift amount p into the defocus amount d, and the image shift amount p of the object image between the first focus detecting signal and the second focus detecting signal. When the defocus amount satisfies d=0, the in-focus is achieved.

In this embodiment, the absolute value of the image shift amount between the first focus detecting signal and the second focus detecting signal increases as the absolute value of the defocus amount between the first focus detecting signal and the second focus detecting signal or the absolute value of the defocus amount of the imaging signal obtained by summing up the first focus detecting signal and the second focus detecting signal increases.

This embodiment performs focusing of the phase difference detecting method using a relationship between the image shift amount and the defocus amount regarding the first focus detecting signal and the second focus detecting signal. The focusing of the phase difference detection method calculates a correlation amount representing the degree of coincidence between the signals by shifting the first focus detecting signal and the second focus detecting signal relative to each other, and detects the image shift amount from the shift amount that improves the correlation (degree of coincidence between the signals). This embodiment performs a focus detection of the phase difference detecting method by converting the image shift amount into the defocus amount based on a relationship that the absolute value of the image shift amount between the first focus detecting signal and the second focus detecting signal increases as the absolute value of the defocus amount of the imaging signal increases.

Baseline Length

Referring now to FIGS. 8A and 8B, a description will be given of a relationship between an image height and a baseline length in the lens apparatus 700 that includes a reflective optical system. FIGS. 8A and 8B are schematic views of light shielding for each image height by the lens apparatus 700. This embodiment defines a position where principal rays of respective pixels in the image sensor 101 intersect each other as a pupil distance of the image sensor 101. z=Ds denotes the pupil distance of the image sensor 101. FIG. 8A illustrates a light shielding state of the lens apparatus 700 that includes the reflective optical system when the focal detecting area including an image height coordinate is set to a central image height (($x_{AF}$, $y_{AF}$)=(0, 0)). For the central image height in FIG. 8A, the baseline length becomes BL1.

FIG. 8B illustrates a light shielding state of the lens apparatus 700 that includes the reflective optical system when the focal detecting area is set to the peripheral image height (($x_{AF}$, $y_{AF}$)=(−10, 0)). The peripheral image height in FIG. 8B shifts from the central image height of FIG. 8A, and the baseline length becomes BL2. At the peripheral image height, the baseline length BL2 in FIG. 8B is shorter than the baseline length BL1 in FIG. 8A.

Referring now to FIGS. 9A and 9B, a description will be given of a relationship between a ratio of the inner diameter to the outer diameter of the exit pupil and the baseline length in the lens apparatus 700 that includes the reflective optical system. FIGS. 9A and 9B are schematic views of light shielding for each exit pupil diameter by the lens apparatus 700. In FIG. 9A, a ratio of the F-number F1 indicating the outer diameter of the exit pupil to the F-number F2 indicating the inner diameter is 2:1. In FIG. 9B, a ratio of the F-number F1 to the F-number F2 is 3:1. FIGS. 9A and 9B illustrate the same image height and the same F-number F2, and the baseline length BL4 in FIG. 9B in which the F-number F1 is larger than the F-number F2 is longer than the baseline length BL3.

Shading Correction

When the exit pupil distance and the pupil distance of the image sensor 101 are different from each other, a difference in signal amount occurs between the first focus detecting signal and the second focus detecting signal according to image heights (shading). The shading correction can reduce the difference between the first focus detecting signal and the second focus detecting signal, and provide a good focus detection.

Focus Detecting Method

Figure 10:
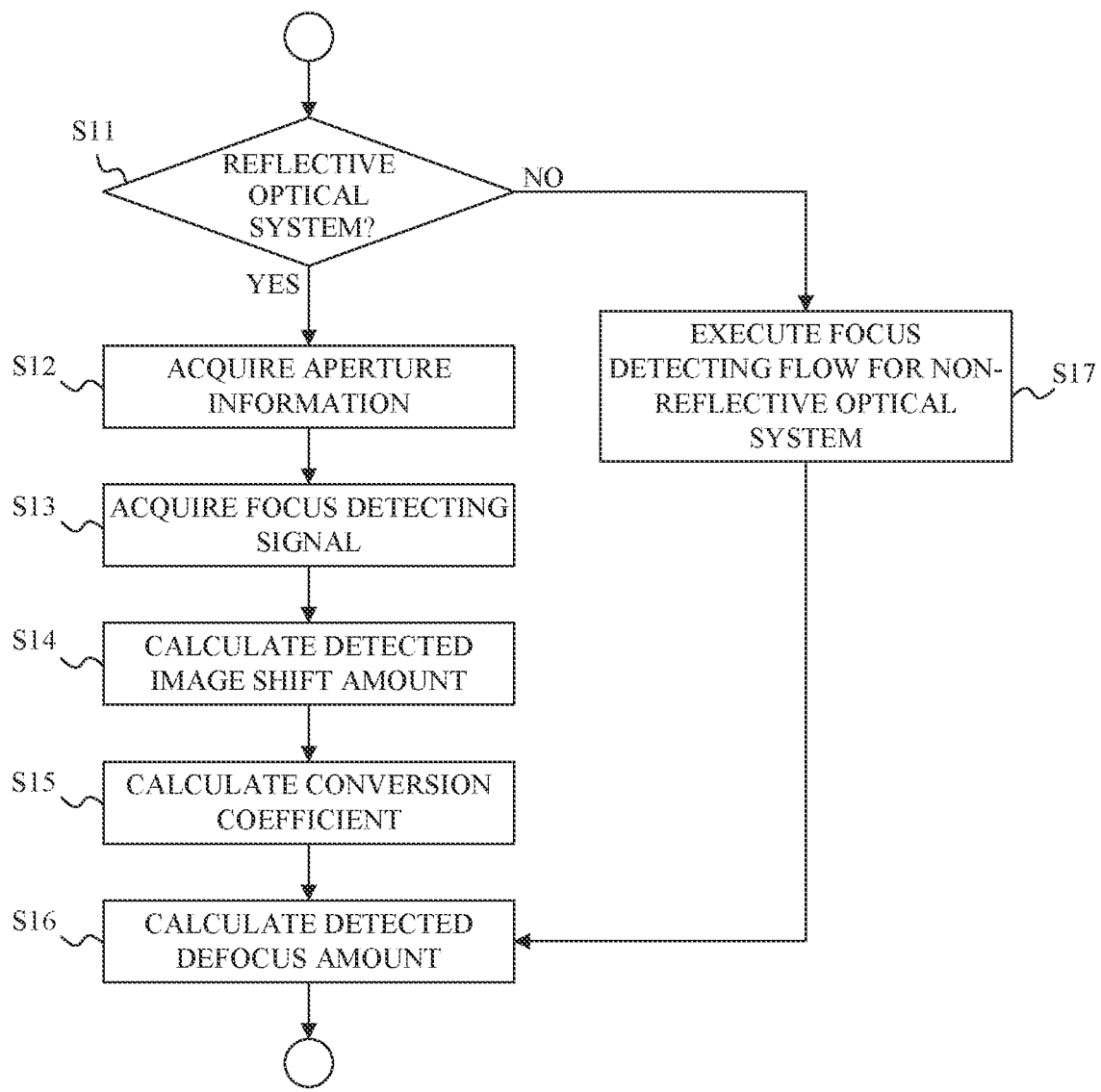
FIG. 10 is a flowchart of a focus detecting method according to the first embodiment.
Figure 15:
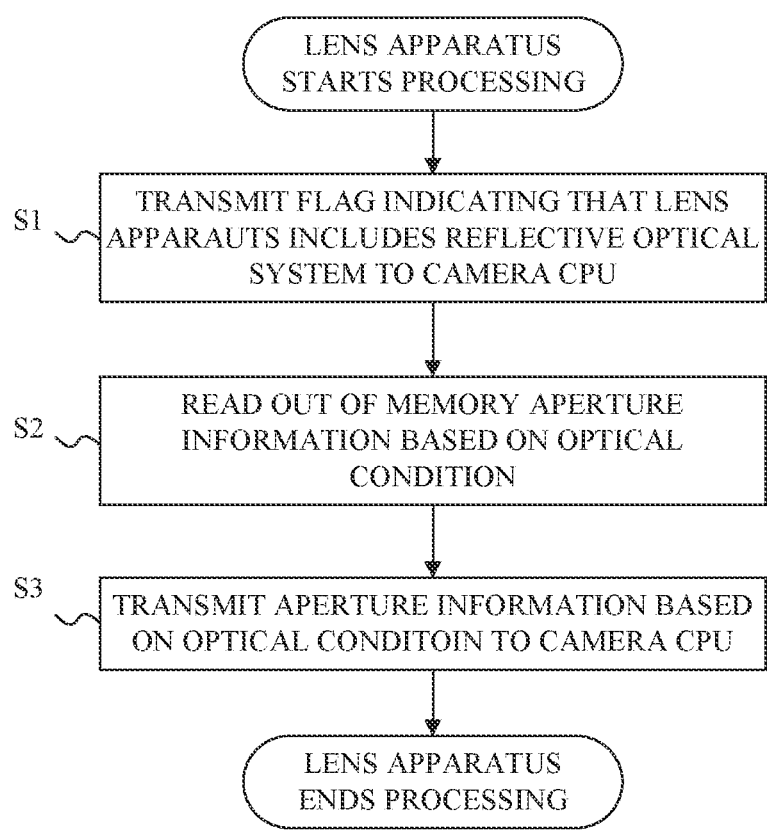
FIG. 15 is a flowchart of a control method of the lens apparatus according to each embodiment.

Referring now to FIG. 10, a description will be given of a focus detecting method according to this embodiment executed by the camera CPU 104. FIG. 10 is a flowchart of the focus detecting method according to this embodiment. The focus detecting method according to this embodiment is executed according to a focus detection program as a computer program that operates with software and hardware. In this embodiment, the camera CPU 104 executes the focus detecting method, but a personal computer (PC) or a dedicated machine may serve as the focus detecting apparatus and execute the focus detecting method according to this embodiment. The focus detecting method according to this embodiment may be executed by providing a circuit corresponding to the focus detecting program according to this embodiment and by operating the circuit. FIG. 15 is a flowchart of processing (control method of the lens apparatus) in the lens apparatus when the lens apparatus attached to the camera body 100 is the lens apparatus 700 that includes the reflective optical system.

First, the lens CPU 407 in the lens apparatus attached to the camera body 100 transmits information (flag) indicating whether or not the lens apparatus includes the reflective optical system to the camera CPU 104 via the lens-side communication terminal (transmitter) 408. When the lens apparatus attached to the camera body 100 is the lens apparatus that includes the reflective optical system, the lens CPU 407 transmits a flag indicating that the lens apparatus includes the reflective optical system to the camera CPU 104 via the lens-side communication terminal 408 in the step S1 in FIG. 15.

In the step S11 in FIG. 10, the camera CPU 104 acquires the flag transmitted from the lens CPU 407 via the camera-side communication terminal (receiver) 113. The camera CPU 104 determines whether or not the lens apparatus attached to the camera body 100 is the lens apparatus 700 that includes the reflective optical system based on the acquired flag. When the lens apparatus attached to the camera body 100 is the lens apparatus 400 that includes no reflective optical system (when the flag indicates that the lens apparatus includes no reflective optical system), the camera CPU 104 proceeds to the step S17 and execute the focus detecting flow for the non-reflective optical system. On the other hand, when the lens apparatus attached to the camera body 100 includes the reflective optical system (when the flag indicates that the lens apparatus includes the reflective optical system), the camera CPU 104 executes the focus detecting method according to this embodiment using the steps S12 to S16 described below.

Next, in the step S2 in FIG. 15, the lens CPU 407 reads out the memory (storage unit) 409 aperture information (aperture information corresponding to the optical condition) based on the optical condition such as a focus state FS of the lens apparatus 700. The aperture information based on the optical condition is stored in the memory 409, for example, as a data table of the optical condition and the aperture information.

Next, in the step S3 in FIG. 15, the lens CPU 407 transmits the aperture information read out of the memory 409 to the camera CPU 104 via the lens-side communication terminal 408. In the step S12 in FIG. 10, the camera CPU 104 acquires the aperture information transmitted from the lens CPU 407 via the camera-side communication terminal 113. The camera CPU 104 acquires information on an image height coordinate ($x_{AF}$, $y_{AF}$) of the focus detecting position. The information on the image height coordinate of the focal point detecting position is calculated by either the camera body 100 or the lens apparatus 700, and when it is calculated by the lens apparatus 700, the lens CPU 407 transmits it as part of the aperture information.

The aperture information includes the F-number F1 ($x_{AF}$, $y_{AF}$, FS) indicating the outer diameter of the exit pupil in the lens apparatus 700, the F-number F2 ($x_{AF}$, $y_{AF}$, FS) indicating the inner diameter of the exit pupil in the lens apparatus 700, and an exit pupil distance LPO1 ($x_{AF}$, $y_{AF}$, FS) of the outer diameter, and an exit pupil distance LPO2 ($x_{AF}$, $y_{AF}$, FS) of the inner diameter. Since the aperture information differs according to the image height coordinate ($x_{AF}$, $y_{AF}$), and the focus state FS, it is described as ($x_{AF}$, $y_{AF}$, FS). The aperture information may include information on a diaphragm frame.

The aperture information is prestored in the memory 409 in the lens apparatus 700, and the data is communicated between the lens apparatus 700 and the camera body 100 at an imaging timing or regularly at a predetermined cycle. Thereby, the aperture information can be acquired from the lens apparatus 700. In this case, the step S3 in FIG. 15 is executed at the imaging timing or at the predetermined cycle. Alternatively, the aperture information prestored in the memory in the camera body 100 may be used. The timing of the data communication may be the timing of the lens exchange, startup, or the like. The aperture information may be acquired from an external device via a network and stored. The optical condition may include information other than the focus state FS, such as an attachment state of an extender, a tilt or shift amount, and an attachment state of various optical filters.

Next, in the step S13 in FIG. 10, the camera CPU 104 acquires the pixel signals received by the subpixels 201 and 202 in each pixel in the image sensor 101. Alternatively, the pixel signal may be used that has been previously imaged by the image sensor 101 according to this embodiment and stored in the storage medium 106.

The camera CPU 104 generates the first focus detecting signal (A) from the received light signal of the first focus detecting pixel in the focus detecting area, and the second focus detecting signal (B) from the received light signal of the second focus detecting pixel in the focus detecting area. More specifically, a signal Y is used which has been calculated by adding up outputs of the four pixels of green (G), red (R), blue (B), and green (G) regarding both the first focus detecting signal and the second focus detecting signal. If necessary, in order to improve the focus detecting accuracy, shading (light amount) correction processing or the like may be performed for a k-th focus detecting signal Yk.

Then, the camera CPU 104 performs bandpass filter processing having a specific passing frequency band for the first focus detecting signal and the second focus detecting signal in order to improve the correlation (the degree of coincidence between signals) and the focus detecting accuracy. Examples of the bandpass filter include a difference type filter such as $\{1, 4, 4, 4, 0, -4, -4, -4, -1\}$ that cut a DC component and performs an edge extraction, and an addition type filter such as $\{1, 2, 1\}$ that suppress the high-frequency noise components.

Next, in the step S14 in FIG. 10, the camera CPU 104 calculates the image shift amount (detected image shift amount) based on the focus detecting signal. The camera CPU 104 performs shift processing that shifts the first and second focus detecting signals that have undergone the filtering processing relative to each other in the pupil dividing direction, and calculates a correlation amount representing the degree of coincidence between the signals. The correlation amount COR is calculated by the following expression:

$$COR(s) = \Sigma_{k \in w} |A(k) - B(k-s)|, s \in \Gamma \quad (1)$$

where $A(k)$ is an k-th first focus detecting signal that has undergone the filtering processing, $B(k)$ is a k-th second focus detecting signal that has undergone the filtering processing, W is a range of the number k corresponding to the focus detecting area, s is a shift amount by the shift processing, and $\Gamma$ is a shift range of the shift amount s.

The camera CPU 104 corresponds a k-th first focus detecting signal $A(k)$ to a $(k-s)$-th second focus detecting signal $B(k-s)$, subtracts them in the shift processing of the shift amount s, and generates a shift subtraction signal. An absolute value of the generated shift subtraction signal is calculated, the sum of the numbers k is calculated in the range W corresponding to the focus detecting area, and the correlation amount COR(s) is calculated. If necessary, the correlation amount calculated for each row may be added up over a plurality of rows for each shift amount. The shift amount of the real value that minimizes the correlation amount is calculated from the correlation amount by the subpixel calculation and set to the detected image shift amount p.

Next, in the step S15 in FIG. 10, the camera CPU 104 calculates the conversion coefficient using the aperture information acquired in the step S12. The calculation method of the conversion coefficient will be described later.

Finally, in the step S16 in FIG. 10, the camera CPU 104 multiplies the detected image shift amount by the conversion coefficient to convert it into the detected defocus amount, and ends the focus detection.

Calculation Method of Conversion Coefficient

Figure 11:
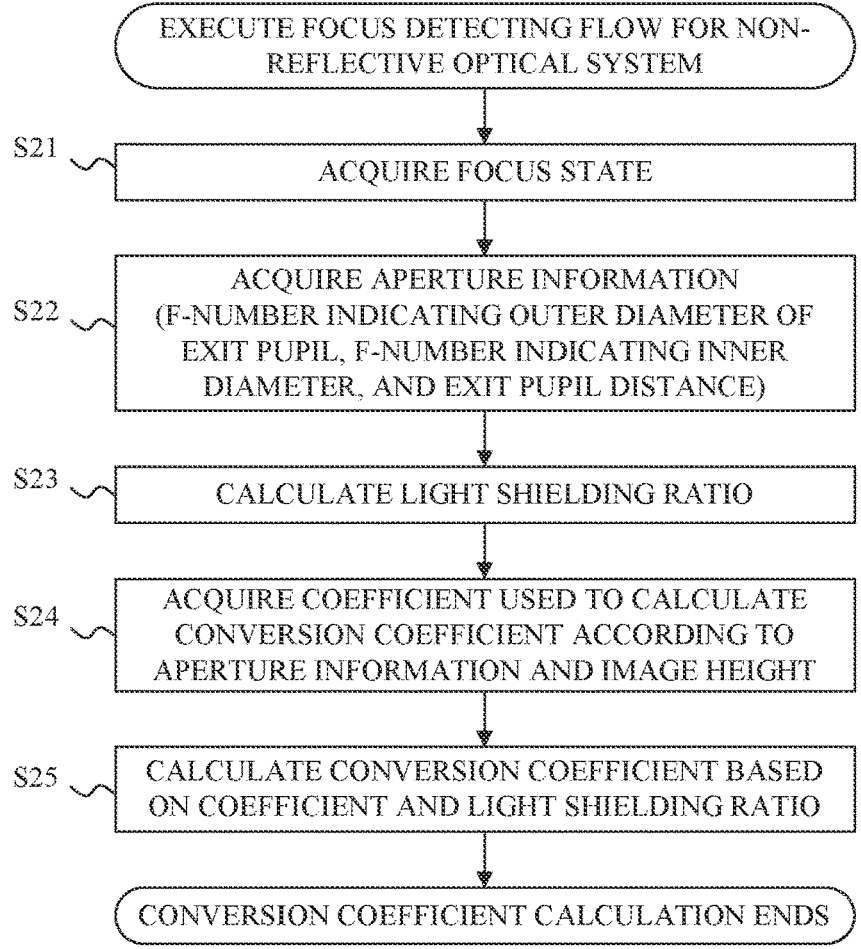
FIG. 11 is a flowchart of a method for calculating a conversion coefficient according to the first embodiment.

Referring now to FIG. 11, a description will be given of a method of calculating the conversion coefficient according to this embodiment (step S15 in FIG. 10). FIG. 11 is a flowchart of the method of calculating the conversion coefficient according to this embodiment. Each step in FIG. 11 is mainly executed by the camera CPU 104 or the lens CPU 407.

First, in the step S21 in FIG. 11, the lens CPU 407 acquires the current focus state FS as the optical condition. Next, in the step S22 in FIG. 11, the lens CPU 407 acquires as aperture information the F-number F1 indicating the outer diameter of the exit pupil of the lens apparatus 700 that includes the reflective optical system, the F-number F2 indicating the inner diameter, the exit pupil distance LPO1 of the outer diameter, and the exit pupil distance LPO2 of the inner diameter. This processing corresponds to the step S2 in FIG. 15. The aperture information is stored in the memory 409 in the lens apparatus 700. The lens CPU 407 transmits the aperture information to the camera CPU 104. This processing corresponds to the step S3 in FIG. 15. The aperture information is acquired based on the image height and the focus state FS (optical condition).

Next, in the step S23 in FIG. 11, the camera CPU 104 calculates a shading ratio R as a ratio of the outer diameter to the inner diameter of the exit pupil by the following expression (2) using the F-numbers F1 and F2:

$$R = F1/F2 \quad (2)$$

Next, in the step S24 in FIG. 11, the camera CPU 104 acquires a coefficient BL (BL00, BL01, BL02) of a function relating to the shading ratio R used to calculate the conversion coefficient. The coefficient is stored in the memory (storage unit) in the camera body 100. The coefficient is a coefficient obtained by fitting, using a quadratic function of the shading ratio R, the baseline length corresponding to the F-number F1 indicating the outer diameter of the exit pupil, the image height, the exit pupil distance LPO1 of the outer diameter, and the exit pupil distance LPO2 of the inner diameter. While the order in the fitting is secondary in this embodiment, it may be primary or tertiary or higher order. The coefficient is stored in the memory as a table depending on the F-number F1 indicating the outer diameter of the exit pupil, the image height, the exit pupil distance LPO1 of the outer diameter, and the exit pupil distance LPO2 of the inner diameter, and acquired by a linear interpolation according to each parameter. The camera CPU 104 calculates the conversion coefficient K by the following expression (3) using the acquired coefficient:

$$BL = BL00 + BL01 \cdot R + BL02 \cdot R^2$$

$$K = 1/BL \quad (3)$$

where BL(BL00 to BL02) is the coefficient acquired in the step S24.

Figure 12:
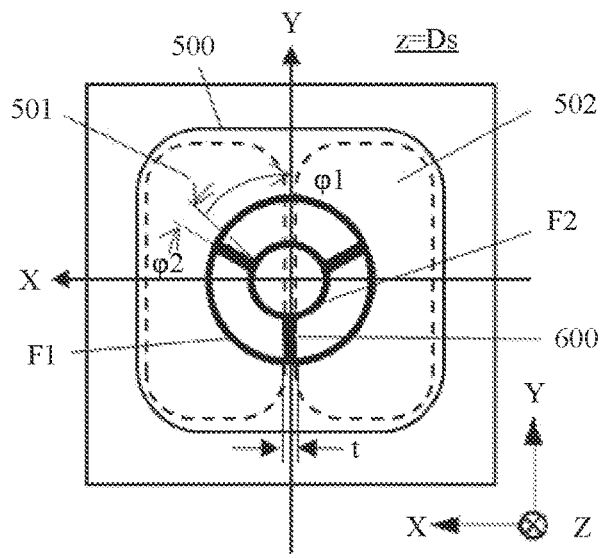
FIG. 12 is a schematic view of light shielding when a light shielding unit of the lens apparatus according to the first embodiment includes a support rod.

When the lens apparatus 700 has a support rod for the light shielding unit 701D, the light shielding 600 by the support rod may add to the aperture information at least one of the attachment number N of support rods, attachment angles φ1 and φ2, or a width t at the pupil distance of the image sensor 101. FIG. 12 is a schematic view of light shielding when a light shielding unit 701D of the lens apparatus 700 that includes the reflective optical system has a support rod. The camera CPU 104 may calculate a conversion coefficient using the expression (3) by storing in the memory the coefficient in the memory as a table based on the F-number F1 indicating the outer diameter of the exit pupil, the image height, the exit pupil distances LP01 and LPO2, the attachment number N of support rods, the attachment angles φ1 and φ2, and the width t.

The above configuration according to this embodiment can calculate, based on the aperture state, the conversion coefficient necessary to convert the image shift amount between the focus detecting signals into the defocus amount, and improve the focus detecting performance.

Second Embodiment

Figure 13:
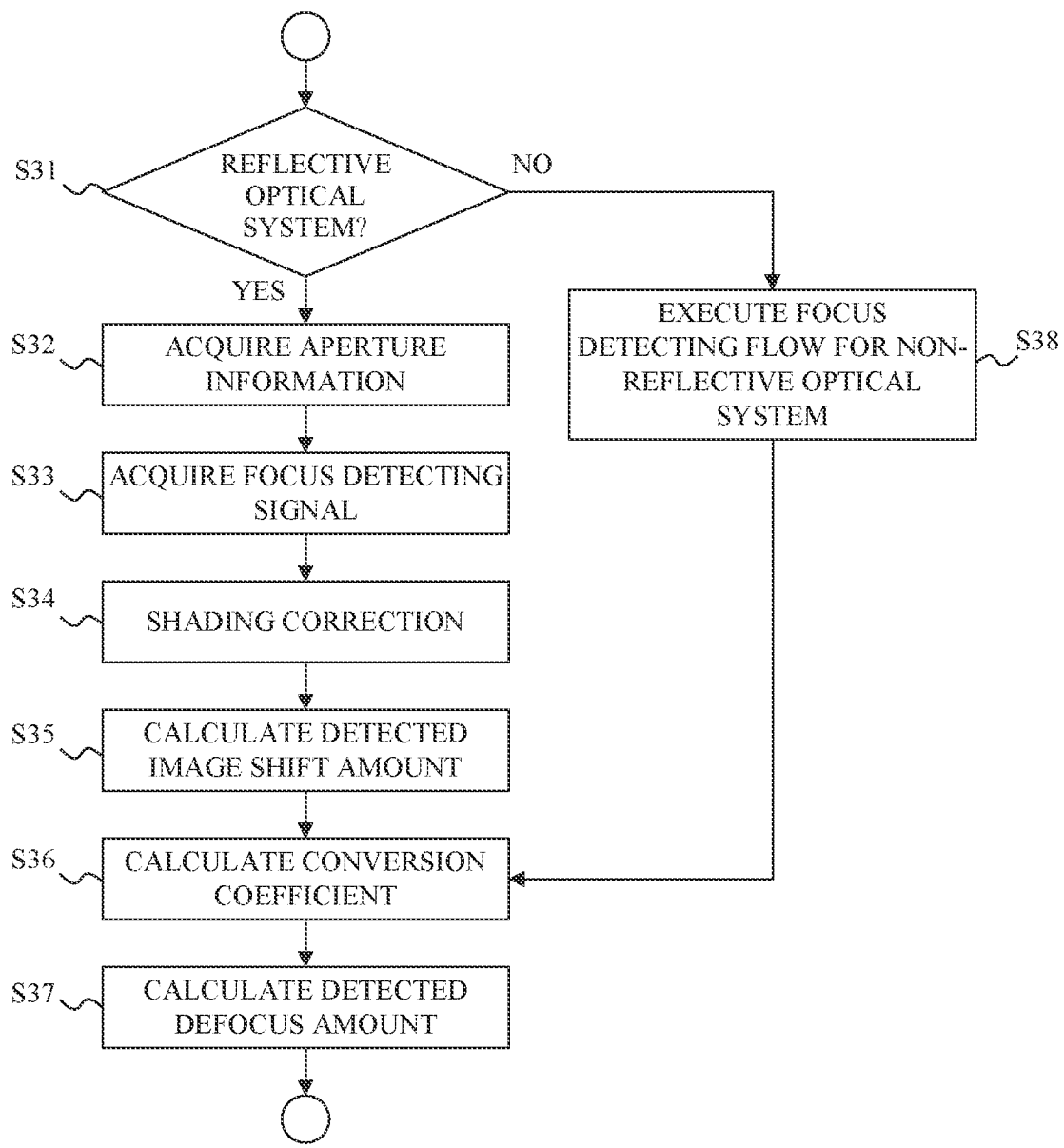
FIG. 13 is a flowchart of a focus detecting method according to a second embodiment.
Figure 14:
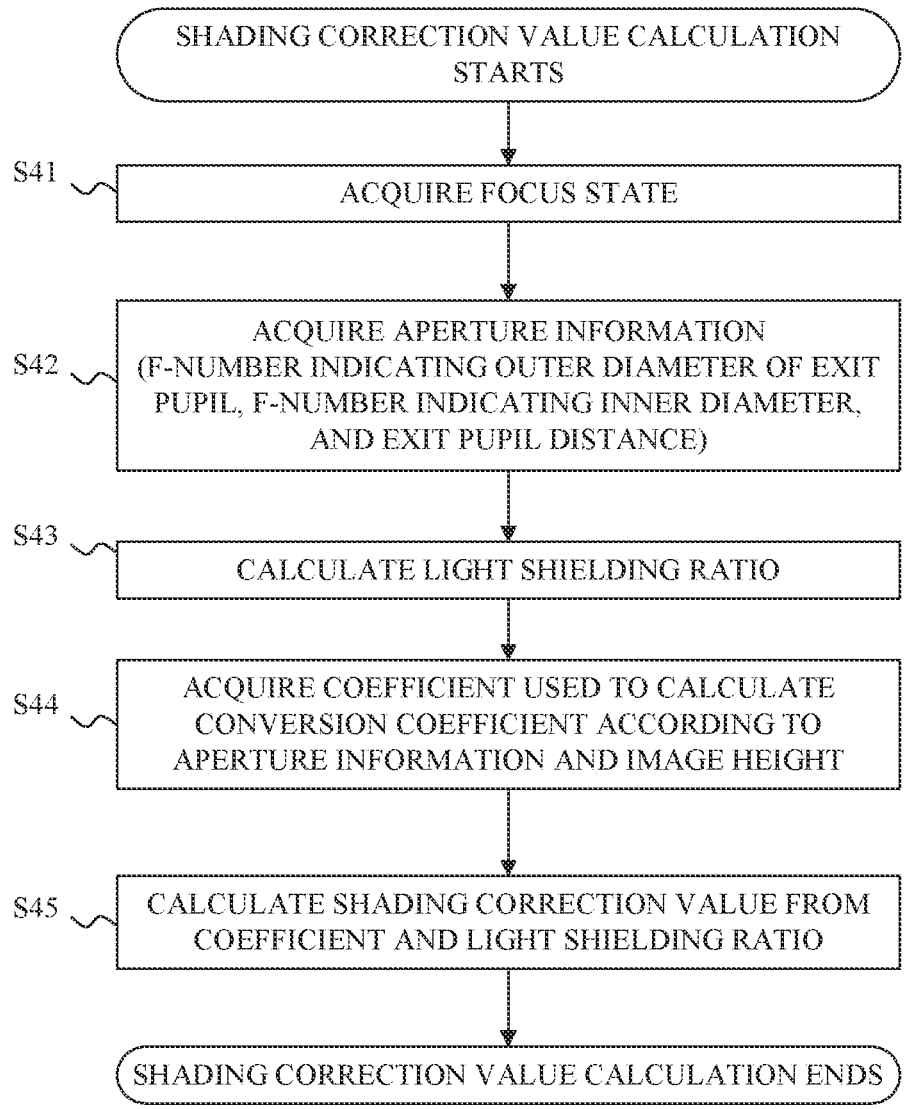
FIG. 14 is a flowchart of a method for calculating a shading correction value according to the second embodiment.

Referring now to FIGS. 13 and 14, a description will be given of a second embodiment of the present invention. FIG. 13 is a flowchart of the focus detecting method according to this embodiment. FIG. 14 is a flowchart of a shading correction value calculating method (step S34 in FIG. 13) according to this embodiment.

In this embodiment, the camera CPU 104 performs the shading correction for the focus detecting signal based on the aperture information of the lens apparatus 700 having the reflective optical system. In the step S31 in FIG. 13, the camera CPU 104 acquires, via the camera-side communication terminal (receiver) 113a, a flag indicating whether or not the lens apparatus that includes the reflective optical system is attached, which has been transmitted from the lens CPU 407 via the lens-side communication terminal (transmitter) 408. When the lens apparatus attached to the camera body 100 includes the reflective optical system, the lens CPU 407 transmits information (flag) indicating that the lens apparatus includes the reflective optical system to the camera CPU 104 via the lens-side communication terminal 408 in the step S1 in FIG. 15. The camera CPU 104 when acquiring the flag indicating that the lens apparatus having the reflective optical system is attached, executes the shading correction method (step S34) according to this embodiment. Since the steps S31 to S33 and S35 to S38 in FIG. 13 are the same as the steps S11 to S17 in FIG. 10, a description thereof will be omitted.

In the flowchart of the shading correction method in FIG. 14, each step is mainly executed by the camera CPU 104 or the lens CPU 407.

First, in the step S41 in FIG. 14, the lens CPU 407 acquires the current focus state FS. Next, in the step S42 in FIG. 14, the lens CPU 407 acquires as the aperture information from the memory 409 the F-number F1 indicating the outer diameter of the exit pupil of the lens apparatus 700, the F-number F2 indicating the inner diameter, the exit pupil distance LPO1 of the outer diameter, and the exit pupil distance LPO2 of the inner diameter. This processing corresponds to the step S2 in FIG. 15. Then, the lens CPU 407 transmits the aperture information to the camera CPU 104 via the camera-side communication terminal 113. This processing corresponds to the step S3 in FIG. 15. The aperture information is thus acquired based on the image height and the focus state FS (optical condition).

Next, in the step S43 in FIG. 14, the camera CPU 104 calculates the shading ratio R as a ratio between the outer diameter to the inner diameter of the exit pupil by the expression (2) using the F-numbers F1 and F2.

Next, in the step S44 in FIG. 14, the camera CPU 104 acquires the coefficient of the function relating to the shading ratio R, which is used to calculate the shading correction value, from the memory. The coefficient is a coefficient obtained by fitting, using a quadratic function of the shading ratio R, the shading correction value corresponding to the F-number F1 indicating the outer diameter of the exit pupil, the image height, the exit pupil distance LPO1 of the outer diameter, and the exit pupil distance LPO2 of the inner diameter. While the order in the fitting is secondary in this embodiment, it may be primary or tertiary or higher order. The coefficient is stored in the memory 409 as a table depending on the F-number F1 indicating the outer diameter of the exit pupil, the image height, the exit pupil distance LPO1 of the outer diameter, and the exit pupil distance LPO2 of the inner diameter, and acquired by a linear interpolation according to each parameter. Next, in the step S45, the camera CPU 104 uses the acquired coefficient and the calculated shading ratio to calculate a shading correction value SA for the first focus detecting signal and a shading correction value SB for the second focus detecting signal using the following expressions (4A) and (4B):

$$SA = SA00 + SA01 \cdot R + SA02 \cdot R^2 \quad (4A)$$

$$SB = SB00 + SB01 \cdot R + SB02 \cdot R^2 \quad (4B)$$

where SA00, SA01, SA02, SB00, SB01, and SB02 are the coefficients acquired in the step S44.

When the lens apparatus 700 includes the support rod for the light shielding unit 701D, the light shielding 600 by the support rod may be added to the aperture information at least one of the attachment number N of support rods, the attachment angles φ1 and φ2, and the width t at the pupil distance of the image sensor 101. The camera CPU 104 may store the coefficients in the memory as a table based on the F-number F1, the image height, the exit pupil distances LPO1 and LPO2, the attachment number N of support rods, the attachment angles φ1 and φ2, and the width t, and calculate the shading correction value using the expressions (4A) and (4B).

The above configuration according to this embodiment enables the shading correction value to be calculated based on the aperture state, and can improve the focus detecting performance.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above embodiments can provide a lens apparatus, an image pickup apparatus, a control method of the lens apparatus, and a storage medium, each of which can detect an accurate defocus amount with a reflective optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-218350, filed on Dec. 28, 2020, which is hereby incorporated by reference herein in its entirety.

What is claimed is:

1. An image pickup apparatus attachable to and detachable from a lens apparatus that includes a reflective optical system, the image pickup apparatus comprising:
an image sensor;
a receiver configured to receive aperture information based on an optical condition of the lens apparatus from the lens apparatus; and
a calculation unit configured to calculate a defocus amount based on the aperture information,
wherein in a case where a lens apparatus attached to the image pickup apparatus includes the reflective optical system, the aperture information includes information on an outer diameter and an inner diameter of an exit pupil of the lens apparatus,
wherein the receiver receives a flag indicating whether or not the lens apparatus attached to the image pickup apparatus includes the reflective optical system, and
wherein the calculation unit makes a difference in calculation method of a conversion coefficient used to calculate the defocus amount, based on the flag.

2. The image pickup apparatus according to claim 1, wherein the calculation unit calculates a conversion coefficient used to calculate the defocus amount based on the aperture information.

3. The image pickup apparatus according to claim 1, wherein the calculation unit calculates a shading correction value based on the aperture information.

4. The image pickup apparatus according to claim 1, wherein the calculation unit calculates an image shift amount based on a first focus detecting signal generated from a received light signal of a first focus detecting pixel that receives a light beam passing through a first pupil part area in an imaging optical system of the lens apparatus, and a second focus detecting signal generated from a received light signal of a second focus detecting pixel that receives a light beam passing through a second pupil part area different from the first pupil part area in the imaging optical system, and calculates the defocus amount based on the image shift amount and a conversion coefficient.

5. An image pickup apparatus attachable to and detachable from a lens apparatus that includes a reflective optical system, the image pickup apparatus comprising:
an image sensor;
a receiver configured to receive aperture information based on an optical condition of the lens apparatus from the lens apparatus; and
a calculation unit configured to calculate a defocus amount based on the aperture information,
wherein in a case where a lens apparatus attached to the image pickup apparatus includes the reflective optical system, the aperture information includes information on an outer diameter and an inner diameter of an exit pupil of the lens apparatus,
wherein the receiver receives a flag indicating whether or not the lens apparatus attached to the image pickup apparatus includes the reflective optical system, and
wherein the calculation unit makes a difference in calculation method of a shading correction value based on the flag.

6. The image pickup apparatus according to claim 5, wherein the calculation unit calculates a conversion coefficient used to calculate the defocus amount based on the aperture information.

7. The image pickup apparatus according to claim 5, wherein the calculation unit calculates a shading correction value based on the aperture information.

8. The image pickup apparatus according to claim 5, wherein the calculation unit calculates an image shift amount based on a first focus detecting signal generated from a received light signal of a first focus detecting pixel that receives a light beam passing through a first pupil part area in an imaging optical system of the lens apparatus, and a second focus detecting signal generated from a received light signal of a second focus detecting pixel that receives a light beam passing through a second pupil part area different from the first pupil part area in the imaging optical system, and calculates the defocus amount based on the image shift amount and a conversion coefficient.

* * * * *